US010043278B2

United States Patent
Kim et al.

(10) Patent No.: US 10,043,278 B2
(45) Date of Patent: Aug. 7, 2018

(54) METHOD AND APPARATUS FOR RECONSTRUCTING 3D FACE WITH STEREO CAMERA

(71) Applicant: Electronics and Telecommunications Research Institute, Daejeon (KR)

(72) Inventors: Kap Kee Kim, Daejeon (KR); Seung Uk Yoon, Daejeon (KR); Bon Woo Hwang, Daejeon (KR); Seong Jae Lim, Daejeon (KR); Hye Ryeong Jun, Daejeon (KR); Jin Sung Choi, Daejeon (KR); Bon Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 407 days.

(21) Appl. No.: 14/609,887

(22) Filed: Jan. 30, 2015

(65) Prior Publication Data

US 2015/0228081 A1    Aug. 13, 2015

(51) Int. Cl.
  *G06T 7/00*  (2017.01)
  *H04N 13/02*  (2006.01)
  *H04N 13/00*  (2018.01)
  *G06T 7/593*  (2017.01)

(52) U.S. Cl.
  CPC ............ *G06T 7/0075* (2013.01); *G06T 7/593* (2017.01); *H04N 13/0014* (2013.01); *H04N 13/0239* (2013.01); *H04N 13/0242* (2013.01); *H04N 13/0282* (2013.01); *G06T 2207/30201* (2013.01); *H04N 2013/0081* (2013.01)

(58) Field of Classification Search
  CPC . G06T 2207/10012; G06T 2207/30201; G06T 7/0075; G06T 7/0022; H04N 13/0239; H04N 13/0282; H04N 13/0242; H04N 13/0014; H04N 2013/0081
  See application file for complete search history.

(56) References Cited

U.S. PATENT DOCUMENTS

| 5,917,937 | A  | * | 6/1999 | Szeliski | G06K 9/20 348/E13.015 |
| 7,379,559 | B2 | * | 5/2008 | Wallace | G06T 7/73 348/113 |
| 7,835,568 | B2 | * | 11/2010 | Park | G06T 17/10 382/154 |
| 7,925,077 | B2 | * | 4/2011 | Woodfill | G06K 9/32 348/46 |
| 8,094,928 | B2 | * | 1/2012 | Graepel | G06K 9/00355 345/419 |

(Continued)

FOREIGN PATENT DOCUMENTS

| KR | 10-2013-0026854 A | 3/2013 |
| KR | 10-2013-0115697 A | 10/2013 |

*Primary Examiner* — Sath V Perungavoor
*Assistant Examiner* — Philip Dang (57) ABSTRACT

Provided is a method and apparatus for reconstructing a three-dimensional (3D) face based on a stereo camera, the method including: acquiring n images of a target by controlling a plurality of stereo cameras in response to an image acquirement request, wherein n denotes a natural number; extracting n face regions from the n images, respectively; and reconstructing a viewpoint-based face image based on the n face regions.

12 Claims, 7 Drawing Sheets

(56) References Cited

U.S. PATENT DOCUMENTS

| | | | | |
|---|---|---|---|---|
| 8,385,610 B2* | 2/2013 | Corcoran | ........... | G06K 9/00228 |
| | | | | 382/103 |
| 8,406,479 B2* | 3/2013 | Tsukizawa | ............. | A61B 3/113 |
| | | | | 340/5.83 |
| 8,509,561 B2* | 8/2013 | Ionita | ................ | G06K 9/00281 |
| | | | | 382/155 |
| 2004/0240725 A1* | 12/2004 | Xu | ........................... | G06K 9/32 |
| | | | | 382/154 |
| 2006/0066612 A1* | 3/2006 | Yang | .................... | G06T 15/205 |
| | | | | 345/419 |
| 2009/0022393 A1* | 1/2009 | Bar-Zohar | ............. | G06T 7/593 |
| | | | | 382/154 |
| 2009/0132371 A1* | 5/2009 | Strietzel | ............. | G06Q 30/0247 |
| | | | | 705/14.46 |
| 2011/0102553 A1* | 5/2011 | Corcoran | ........... | G06K 9/00281 |
| | | | | 348/50 |
| 2012/0063669 A1* | 3/2012 | Hong | ...................... | G06T 7/593 |
| | | | | 382/154 |
| 2013/0039548 A1* | 2/2013 | Nielsen | ................ | G06T 3/0093 |
| | | | | 382/118 |
| 2013/0057644 A1* | 3/2013 | Stefanoski | ................ | G06T 5/50 |
| | | | | 348/42 |
| 2013/0222548 A1 | 8/2013 | Yang et al. | | |
| 2013/0258067 A1* | 10/2013 | Zhang | ................ | H04N 13/0242 |
| | | | | 348/48 |
| 2013/0272609 A1* | 10/2013 | Sun | ...................... | G06T 7/0079 |
| | | | | 382/173 |
| 2013/0301906 A1* | 11/2013 | Yoon | ....................... | G06T 17/00 |
| | | | | 382/154 |

\* cited by examiner

METHOD AND APPARATUS FOR RECONSTRUCTING 3D FACE WITH STEREO CAMERA

CROSS-REFERENCE TO RELATED APPLICATION

This application claims the priority benefit of Korean Patent Application No. 10-2014-0014664, filed on Feb. 10, 2014, in the Korean Intellectual Property Office, the disclosure of which is incorporated herein by reference.

BACKGROUND

1. Field of the Invention

Embodiments of the present invention relate to a technology for highly precisely reconstructing a face based on a stereo camera, which is applied to a medical service and the like.

2. Description of the Related Art

In a conventional medical service field, a variety of methods of capturing an image of a target have been employed.

For example, in the related art, a highly precise result may be obtained by capturing an image of a target based on an active sensor, for example, a three-dimensional (3D) scanner and a structured light.

However, in the case of using the active sensor, although a result with a relatively high accuracy may be obtained, the target may need to maintain an immobile posture while being taken. In addition, depending on a type of the active sensor, the target may have an increasing feeling of fatigue on eyes. In many cases, the target may be a patient and thus, it may be great burden for the target to participate in being taken while standing dazzling in an immobile posture.

In the case of using a passive sensor, although an accuracy is deteriorated compared to the active sensor, capturing an image of the target may be performed within a relatively short period of time under an appropriate light. Accordingly, it is possible to decrease burden of the target having about the immobile posture and a feeling of fatigue on eyes.

Accordingly, in the related art, a method of capturing an image of a target a plurality of times with a single camera based on a passive sensor is proposed. However, even in this case, the target may needs to maintain an immobile posture while being taken and thus, may feel burden for being taken.

Accordingly, there is a need for an apparatus that may readily capture an image of a target while having a performance similar to a highly precise face reconstruction based on an active sensor and decreasing burden of the target being taken such as a method using a passive sensor.

SUMMARY

An aspect of the present invention provides a method and apparatus for reconstructing a three-dimensional (3D) face based on a stereo camera that may capture images of a target using a plurality of stereo cameras and may reconstruct a viewpoint-based face image using a face region extracted from each captured image, thereby decreasing the fatigue of the target and also reconstructing a highly precise 3D face with a performance similar to an active sensor.

Another aspect of the present invention also provides a method and apparatus for reconstructing a 3D face based on a stereo camera that may simultaneously capture images of a target through a plurality of stereo cameras, thereby decreasing burden of the target being taken about a motion and dazzling during a scanning and also achieving a highly precise reconstruction performance comparable to a performance of an active sensor.

According to an aspect of the present invention, there is provided a method of reconstructing a 3D face based on a stereo camera, the method including: acquiring n images of a target by controlling a plurality of stereo cameras in response to an image acquirement request, wherein n denotes a natural number; extracting n face regions from the n images, respectively; and reconstructing a viewpoint-based face image based on the n face regions According to another aspect of the present invention, there is provided an apparatus for reconstructing a 3D face based on a stereo camera, the apparatus including: an acquirer configured to acquire n images of a target by controlling a plurality of stereo cameras in response to an image acquirement request, wherein n denotes a natural number; an extractor configured to extract n face region from the n images, respectively; and a re-constructer configured to reconstruct a viewpoint-based face image based on the n face regions.

Effect

According to embodiments of the present invention, it is possible to decrease a feeling of fatigue of a target and also to reconstruct a highly precise three-dimensional (3D) face with a performance similar to an active sensor by capturing images of the target using a plurality of stereo cameras, and by reconstructing a viewpoint-based face image using a face region extracted from each captured image.

According to embodiments of the present invention, it is possible to decrease burden of a target being taken about a motion and dazzling during a scanning and also to achieve a highly precise reconstruction performance comparable to a performance of an active sensor by simultaneously capturing images of the target through a plurality of stereo cameras based on a passive sensor.

According to embodiments of the present invention, it is possible to reconstruct a highly precise 3D face that is readily applicable to a medical service field, such as orthodontics and a service that helps predict an appearance after a plastic surgery.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

Embodiments of the present invention may include a plurality of stereo cameras based on a passive sensor to simultaneously capture images of a target. Also, each stereo camera may include a plurality of digital single-lens reflex (DSLR) cameras.

For example, embodiments of the present invention may simultaneously acquire images of a target by controlling three stereo cameras, for example, 6 DSLR cameras.

Also, an image resolution of each stereo camera may be, for example, about minimum 100,000 pixels. A speed of each stereo camera reacting to a signal in order to acquire a synchronization image may be defined to be faster than, for example, 1/24 seconds.

Figure 1:
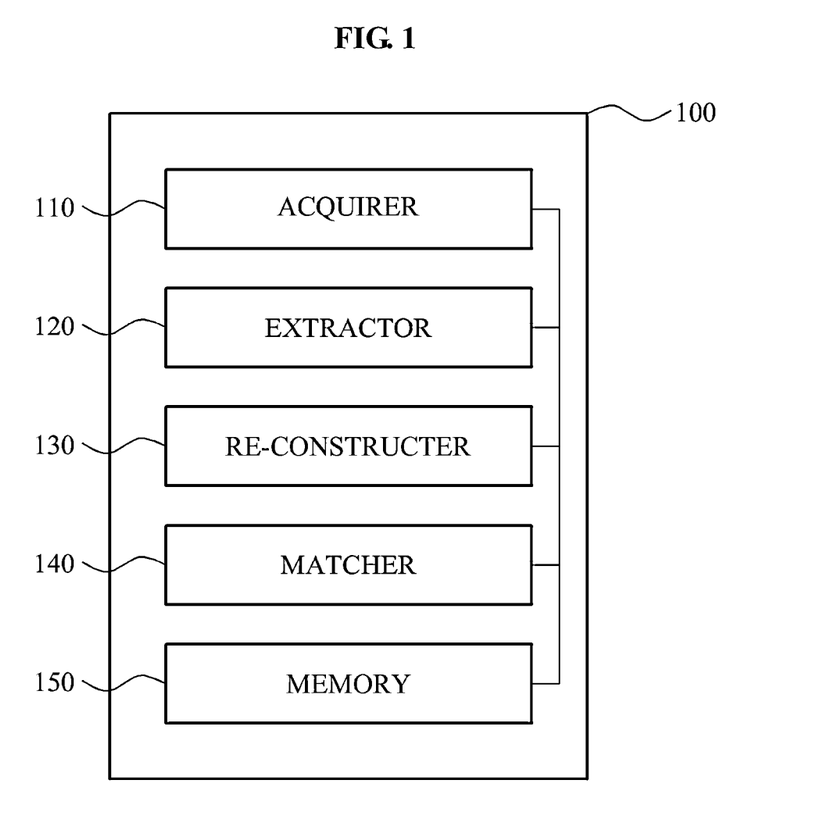
FIG. 1 is a block diagram illustrating a configuration of an apparatus for reconstructing a three-dimensional (3D) face based on a stereo camera according to an embodiment of the present invention.

FIG. 1 is a block diagram illustrating a configuration of an apparatus 100 (hereinafter, a 3D face reconstruction apparatus) for reconstructing a three-dimensional (3D) face based on a stereo camera according to an embodiment of the present invention.

Referring to FIG. 1, the 3D face reconstruction apparatus 100 may include an acquirer 110, an extractor 120, and a re-constructer 130. Depending on embodiments, the 3D face reconstruction apparatus 100 may further include a matcher 140 and a memory 150.

The acquirer 110 may acquire n images of a target by controlling a plurality of stereo cameras in response to an image acquirement request. Here, n denotes a natural number.

The image acquirement request may be generated through a hardware method using wired/wireless equipment or a software method using a button click on a personal computer (PC) screen.

The acquirer 110 may generate a synchronization signal for a type of each stereo camera, may control the plurality of stereo cameras to simultaneously capture images of the target, and may read and acquire each image that is stored and maintained in the memory 150 to correspond to identification information according to the simultaneous capturing.

For example, the acquirer 110 may detect, as a user capture signal, a hardware signal generated by the wired/wireless equipment or a software signal generated in response to a user's button click on the PC screen.

In response to the hardware signal or the software signal detected as the user capture signal, the acquirer 110 may regenerate a hardware signal for acquiring synchronization images from the plurality of stereo cameras.

The acquirer 110 may control the plurality of stereo cameras to simultaneously capture images of the target by generating a synchronization signal corresponding to a type of each connected stereo camera.

The acquirer 110 may download each captured image in the memory 150 in association with identification information, for example, a name and a number, and thereby maintain the images in the memory 150.

The extractor 120 may extract n face regions from n images, respectively.

For example, the extractor 120 may model a background region included in an image based on a guideline for each stereo camera, may remove a first background region from a region obtained through modeling, and may extract a face region from the image.

Each of images acquired by the plurality of stereo cameras may include a background region and a region in which a background and a foreground coexist. The extractor 120 may perform background modeling on each image based on a guideline, and may remove, from each image, a background region corresponding to a region outside the guideline for face capturing.

Here, a guideline may be indicated on only a single stereo camera. The extractor 120 may estimate a guideline from each stereo camera using a correction factor, and may remove a certain background region from each image.

Also, the extractor 120 may remove a first background portion having a similar pixel to the background region, from a region acquired by removing the background region, for example, the region in which the background and the foreground coexist.

The extractor 120 may further remove a second background portion included in a remaining region from which the first background portion is removed, using face shape information of the target, or may extract the face region by adding, to the remaining region, a face portion included in the removed first background portion.

A portion excluding the face region may be classified as a foreground and thereby included in the remaining region from which the first background portion is removed. In this example, the first extractor 120 may extract the face region by further removing the second background portion from the remaining region using face shape information on a facial size and frame of the target. Alternatively, when a portion of a face is removed from the first background portion, the extractor 120 may extract a face region in which the removed portion of the face is filled using the face shape information.

When extraction of the face region is completed, the extractor 120 may generate a mask image of the extracted face region.

The re-constructor 130 may reconstruct a viewpoint-based face image based on the n face regions.

For example, the re-constructor 130 may generate a disparity map about a stereo camera used to acquire an image, and may generate a 3D coordinate value at which a face region is positioned on the viewpoint-based face image, using the disparity map.

In detail, the re-constructor 130 may warp an epipolar line of an image acquired from each stereo camera using a correction factor, may show a disparity between images with respect to a correspondence point within each warped image as a two-dimensional (2D) map, for example, the disparity map, and may remove an inaccurate disparity value to minimize a mismatching error between a disparity value of the correspondence point and neighboring disparity values. The re-constructor 130 may generate a 3D coordinate value of a predetermined point within an image using the disparity map and the correction factor, may form a 3D graphics polygon based on the 3D coordinate value, and may minimize a positional error between 3D graphics polygons.

The matcher 140 may remove an estimated error point from the viewpoint-based face image, and may perform matching processing on the viewpoint-based face image from which the estimated error point is removed.

The matcher 140 may calculate a correspondence point of a predetermined point within a first face image and a disparity value of the correspondence point, from a second face image having a viewpoint different from a viewpoint of the first face image, and may compare the disparity value of the correspondence point with a disparity value of a neighboring correspondence point identified from the second face image. When a difference between the disparity value of the correspondence point and the disparity value of the neighboring correspondence point exceeds a predetermined error range, the matcher 140 may remove the correspondence point from the second face image and thereby remove the estimated error point from the viewpoint-based face image.

Here, the matcher 140 may identify a point having a disparity value or a 3D coordinate value exceeding a predetermined error range from the viewpoint-based face image, using face shape information of the target, and may remove the identified point from the viewpoint-based face image.

For example, the matcher 140 may find the estimated error point by finding a correspondence point from another face image based on a single face image, by calculating the disparity value of the correspondence point, by comparing the disparity values of the correspondence points, and by determining whether a difference between the disparity values of the correspondence points is within a predetermined error range. Alternatively, the matcher 140 may find an abnormal disparity value or 3D coordinate value from a reconstructed viewpoint-based face image, using pre-input face shape information, for example, a facial size and frame of the target, and may regard the found disparity value or 3D coordinate value as the estimated error point. The matcher 140 may remove the estimated error point from the viewpoint-based face image.

The matcher 140 may perform final reconstruction by removing an estimated error point from each viewpoint-based face image, by minimizing an error, and by performing matching processing. Accordingly, it is possible to prevent propagation of an error value and to achieve a highly precise face reconstruction with a performance similar to an active sensor, for example, the average error of about 0.5 mm.

The matcher 140 may merge viewpoint-based face images into a single face image, may generate a texture map about the merged face image using visual field portions and non-visual field portions of the plurality of stereo cameras, and may process the entire tone of the generated texture map to be matched.

When merging the viewpoint-based face images into a single face image, the merger 140 may merge an overlapping region between the viewpoint-abased face images to be merged, using an average value.

Also, the merger 140 may generate a texture map about the merged face image using a visual field portion and a non-visual field portion of each of the plurality of stereo cameras.

The texture map is acquired using visual field portions and non-visual field portions of different stereo cameras and thus, the matcher 140 may match a mismatching texture based on a light and a camera state.

According to an embodiment of the present invention, it is possible to decrease a feeling of fatigue of a target and also to reconstruct a highly precise 3D face with a performance similar to an active sensor by capturing images of the target through a plurality of stereo cameras, and by reconstructing a viewpoint-based face image based on a face region extracted from each captured image.

Also, according to an embodiment of the present invention, it is possible to decrease burden of a target being taken about a motion and dazzling during a scanning and also to achieve a highly precise reconstruction performance comparable to a performance of an active sensor by simultaneously capturing images of the target through a plurality of stereo cameras based on a passive sensor.

Also, according to an embodiment of the present invention, it is possible to reconstruct a highly precise 3D face that is readily applicable to a medical service field, such as orthodontics and a service that helps predict an appearance after a plastic surgery.

Figure 2:
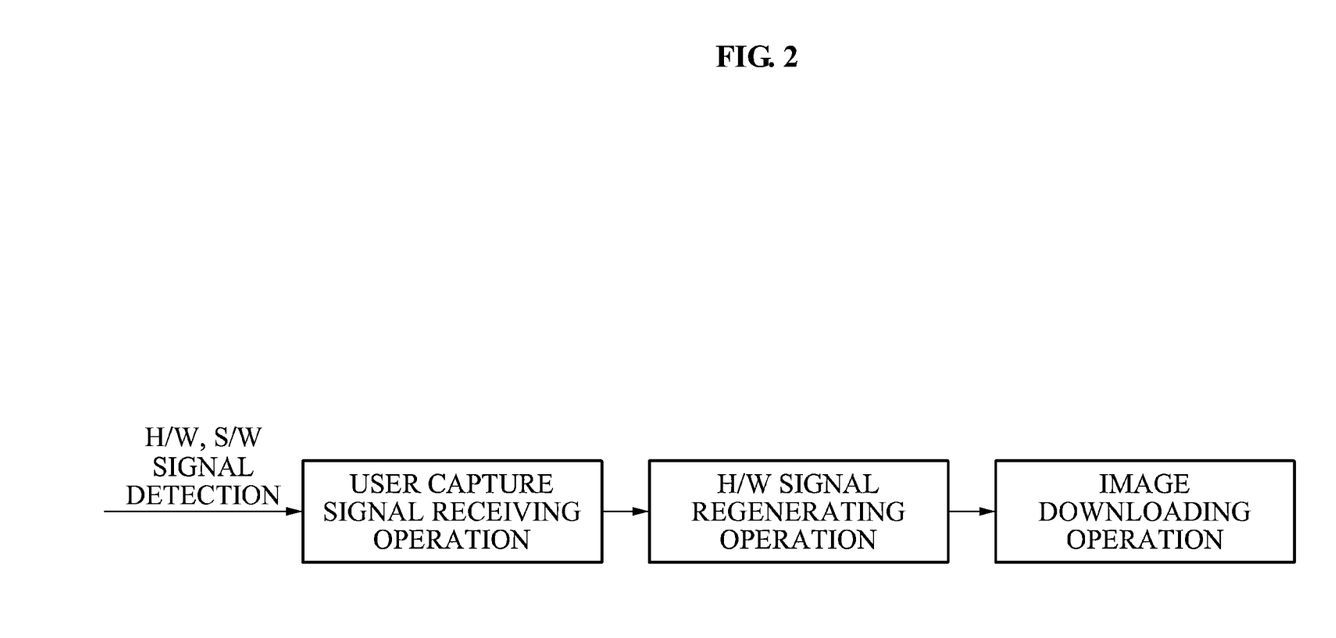
FIG. 2 illustrates a process of acquiring a synchronization image of a target.

FIG. 2 illustrates a process of acquiring a synchronization image of a target.

Referring to FIG. 2, in a user capture signal receiving operation, a 3D face reconstruction apparatus may detect a user capture signal generated in response to an image acquirement request of a user, for example, a photographer.

For example, the 3D face reconstruction apparatus may detect, as the user capture signal, a hardware (H/W) signal generated by wired/wireless equipment or a software (S/W) signal generated in response to the user's button click on a PC screen.

In response to the hardware signal or the software signal detected as the user capture signal, the 3D face reconstruction apparatus may regenerate a hardware signal for acquiring synchronization images from a plurality of stereo cameras in an H/W signal regenerating operation.

In detail, the 3D face reconstruction apparatus may control the plurality of stereo cameras to simultaneously capture images of the target by generating a synchronization signal corresponding to a type of each connected stereo camera.

In an image downloading operation, the 3D face reconstruction apparatus may download each captured image in a memory, for example, a hard disk in association with identification information, for example, a name and a number, and thereby maintain the captured images in the memory.

Figure 3:
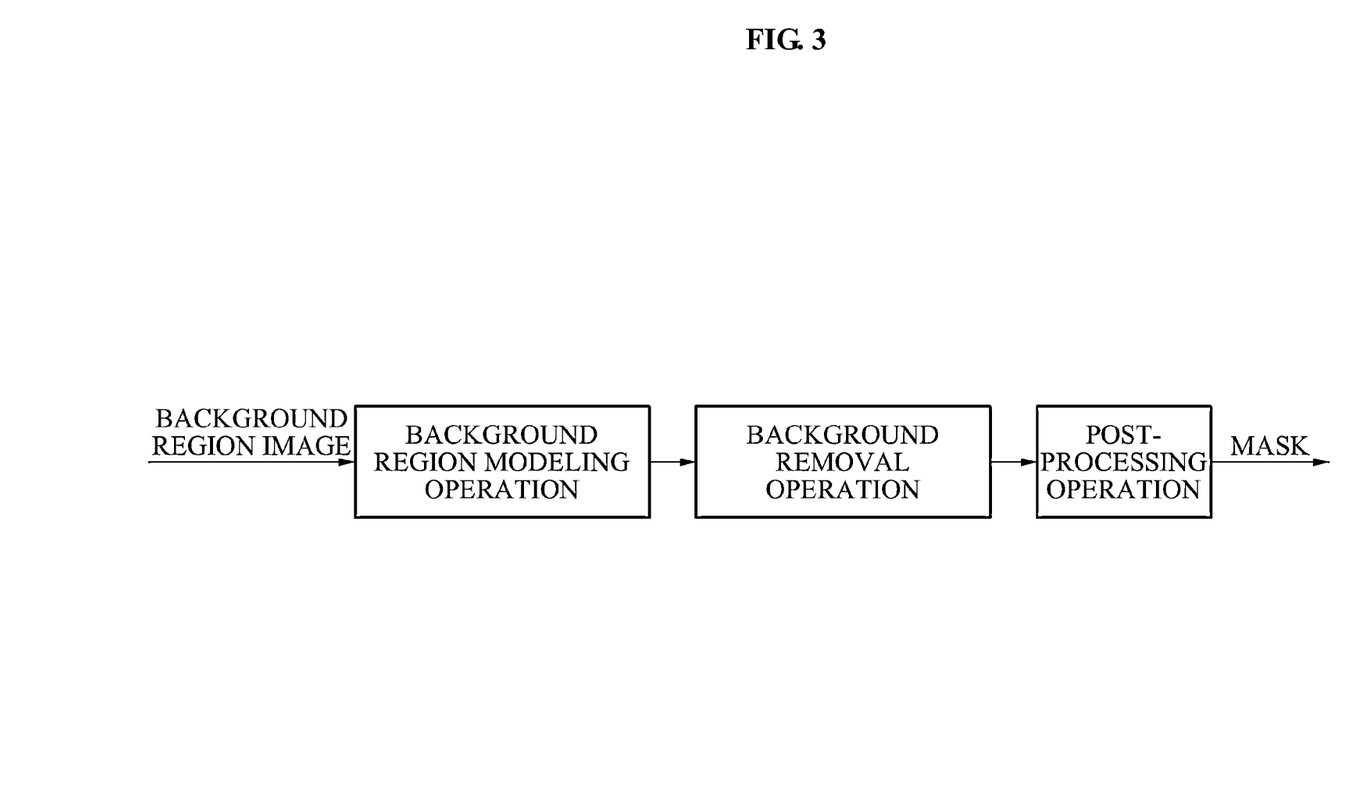
FIG. 3 illustrates a process of extracting a face region.

FIG. 3 illustrates a process of extracting a face region.

Referring to FIG. 3, the 3D face reconstruction apparatus may extract a foreground, for example, a face region by removing a background from an image captured by each stereo camera, and may remove again a portion excluding the foreground.

For example, each of images captured by a plurality of stereo cameras may include a background region and a region in which the background and the foreground coexist. In a background region modeling operation, the 3D face reconstruction apparatus may perform background modeling on each image based on a guideline. The 3D face reconstruction apparatus may remove, from each image, a background region corresponding to a region outside the guideline for face capturing.

Here, a guideline may be indicated on only a single stereo camera. The 3D face reconstruction apparatus may estimate a guideline from each stereo camera using a correction factor, and may remove a certain background region from each image.

In a background removal operation, the 3D face reconstruction apparatus may remove a first background portion having a similar pixel to the background region from a region acquired by removing the background region, for example, the region in which the background and the foreground coexist.

A portion excluding the face region may be classified as a foreground and thereby included in the remaining region from which the first background portion is removed. In this example, in a post-processing operation, the 3D face reconstruction apparatus may extract the face region by further removing the second background portion from the remaining region using pre-input face shape information on a facial size and frame of the target. Alternatively, when a portion of a face is removed from the first background portion, m the 3D face reconstruction apparatus may extract a face region in which the removed portion of the face is filled using the face shape information.

When extraction of the face region is completed, the 3D face reconstruction apparatus may generate a mask image of the extracted face region.

Figure 4:
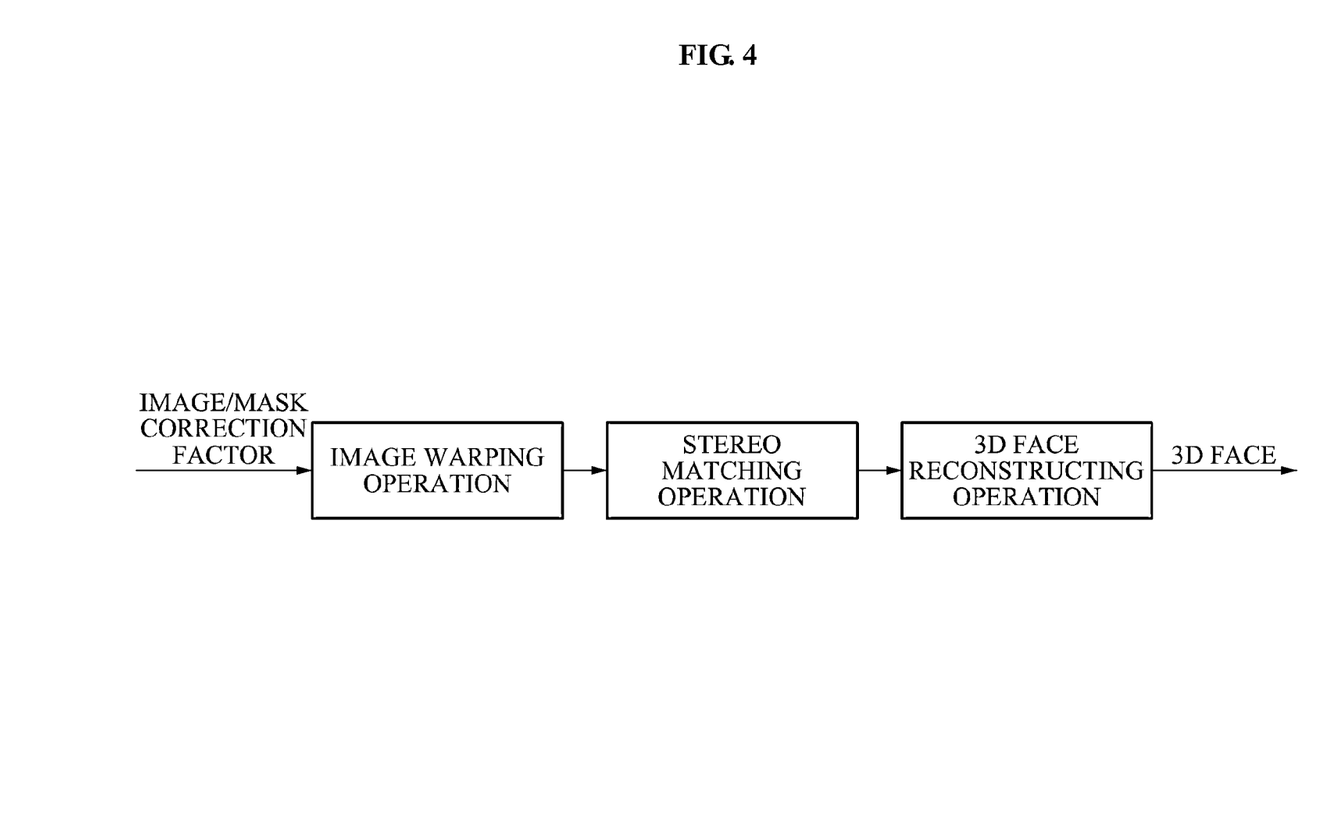
FIG. 4 illustrates a process of reconstructing a viewpoint-based face image.

FIG. 4 illustrates a process of reconstructing a viewpoint-based face image.

Referring to FIG. 4, in an image warping operation, the 3D face reconstruction apparatus may warp epipolar lines of two images acquired from the respective stereo cameras using a correction factor.

In a stereo matching operation, the 3D face reconstruction apparatus may show a disparity between images with respect to a correspondence point within each warped image as a 2D map, for example, the disparity map, and may remove an inaccurate disparity value to minimize a mismatching error between a disparity value of the correspondence point and neighboring disparity values.

In a 3D face reconstructing operation, the 3D face reconstruction apparatus may generate a 3D coordinate value of a predetermined point within an image using the disparity map and the correction factor, may form a 3D graphics polygon based on the 3D coordinate value, and may minimize a positional error between 3D graphics polygons.

Figure 5:
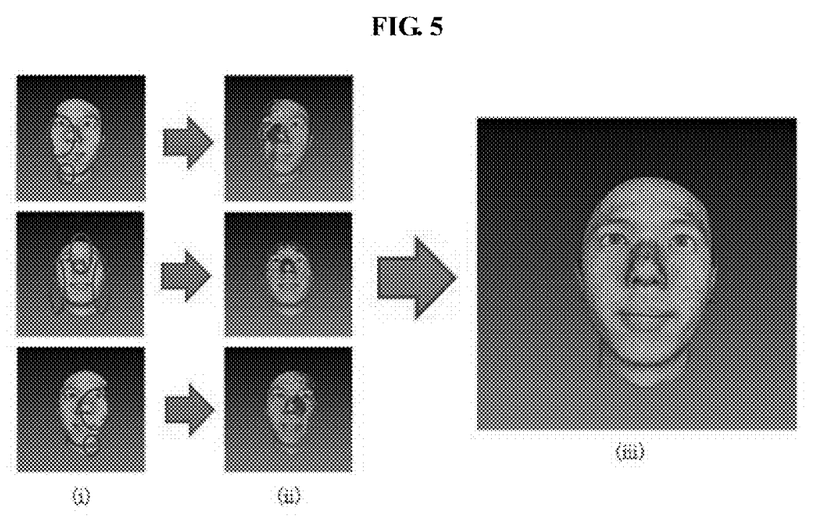
FIG. 5 illustrates a process of removing an estimated error point.

FIG. 5 illustrates a process of removing an estimated error point.

Referring to (i) of FIG. 5, the 3D face reconstruction apparatus may reconstruct a face image for each viewpoint using a face region extracted from an image captured through each stereo camera.

Here, the 3D face reconstruction apparatus may reconstruct a viewpoint-based face image using an image captured by a stereo camera installed at a corresponding viewpoint. Accordingly, a region not accurately captured at the corresponding viewpoint, for example, a marked portion in (i) of FIG. 5 may have a degraded accuracy in reconstruction.

Accordingly, referring to (ii) of FIG. 5, the 3D face reconstruction apparatus may find an inaccurately captured region, for example, an estimated error point from each viewpoint-based face image, and may remove the found region from each viewpoint-based face image.

For example, the 3D face reconstruction apparatus may find the estimated error point by finding a correspondence point from another face image based on a single face image, by calculating the disparity value of the correspondence point, by comparing the disparity values of the correspondence points, and by determining whether a difference between the disparity values of the correspondence points is within a predetermined error range. Alternatively, the 3D face reconstruction apparatus may find an abnormal disparity value or 3D coordinate value from a reconstructed viewpoint-based face image, using pre-input face shape information, for example, a facial size and frame of the target, and may regard the found disparity value or 3D coordinate value as the estimated error point. The 3D face reconstruction apparatus may remove the estimated error point from the viewpoint-based face image.

Referring to (iii) of FIG. 5, the 3D face reconstruction apparatus may perform matching processing on each viewpoint-based face image from which the estimated error point is removed, thereby minimizing an error and increasing an accuracy when reconstructing a face of the target.

In detail, the 3D face reconstruction apparatus may perform final reconstruction by removing an estimated error point from each viewpoint-based face image, by minimizing an error, and by performing matching processing. Accordingly, it is possible to prevent propagation of an error value and to achieve a highly precise face reconstruction with a performance similar to an active sensor, for example, the average error of about 0.5 mm.

Figure 6:
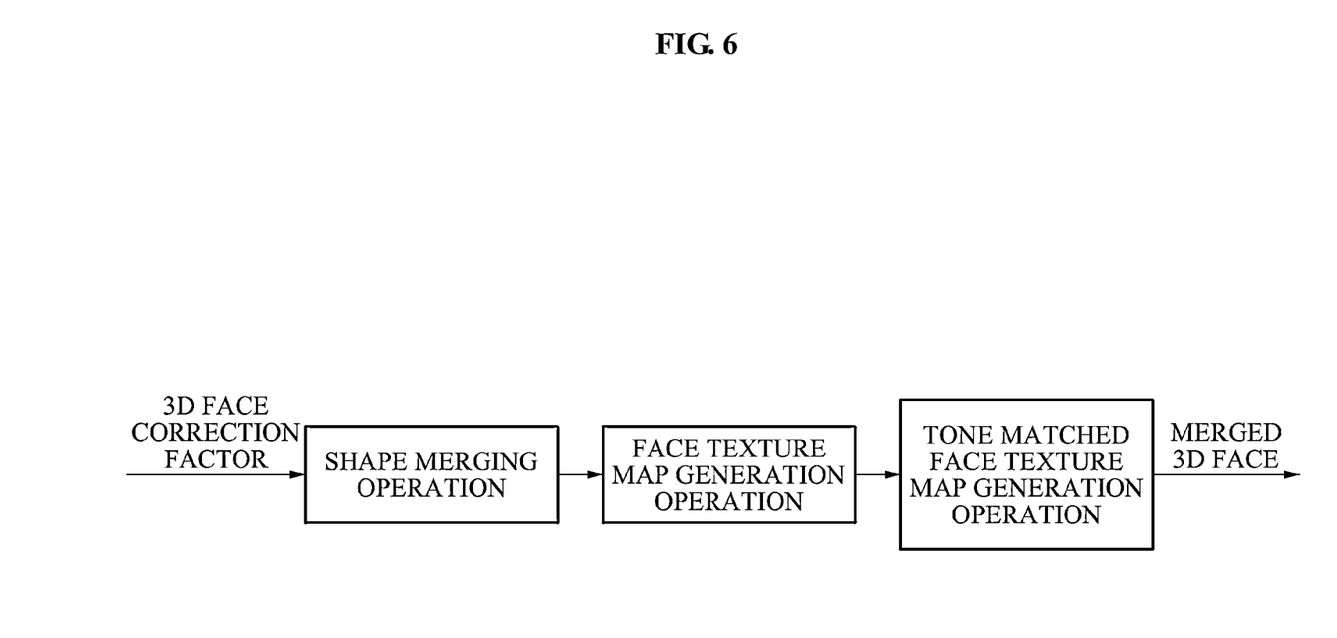
FIG. 6 illustrates a process of performing matching processing of viewpoint-based face images.

FIG. 6 illustrates a process of performing matching processing of viewpoint-based face images.

Referring to FIG. 6, in a shape merging operation, the 3D face reconstruction apparatus may merge, into a single face image using a correction factor, viewpoint-based face images reconstructed for the respective stereo cameras. In the merging operation, an overlapping region may be merged based on an average value.

In a face texture map generation operation, the 3D face reconstruction apparatus may generate a texture map about the merged face image using a visual field portion and a non-visual field portion of each of the plurality of stereo cameras.

Here, the texture map is acquired using visual field portions and non-visual field portions of different stereo cameras and thus, the texture map may be generated to have a different tone based on a light and a camera state. Accordingly, in a tone matched face texture map generation operation, the 3D face reconstruction apparatus may perform a function of matching a mismatching texture.

Hereinafter, an operation flow of the 3D face reconstruction apparatus 100 of FIG. 1 according to embodiments of the present invention will be described.

Figure 7:
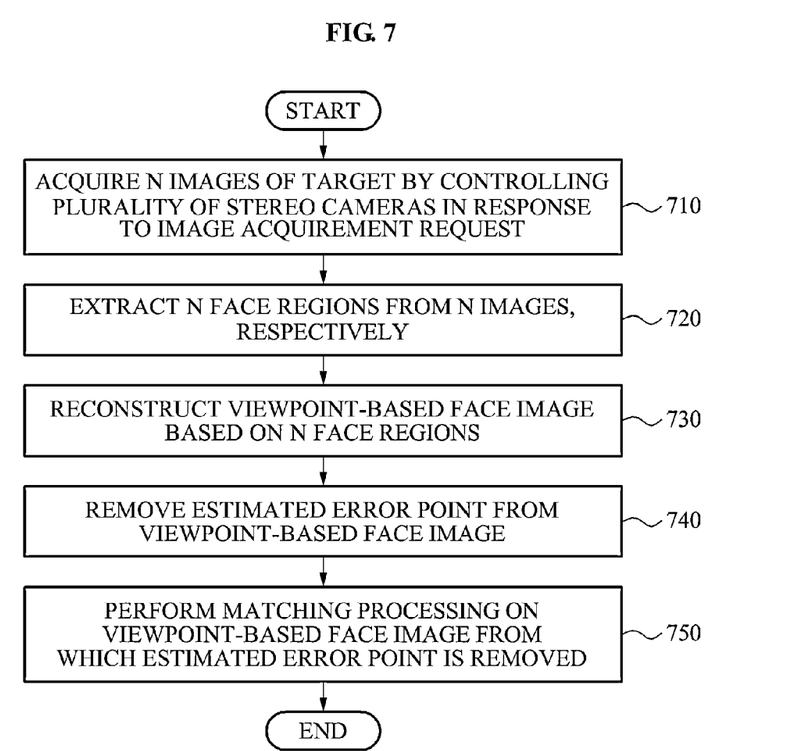
FIG. 7 is a flowchart illustrating a method of reconstructing a 3D face based on a stereo camera according to an embodiment of the present invention.

FIG. 7 is a flowchart illustrating a method of reconstructing a 3D face based on a stereo camera according to an embodiment of the present invention.

The method of reconstructing a 3D face based on a stereo camera of FIG. 7 may be performed by the 3D face reconstruction apparatus 100 of FIG. 1.

Referring to FIG. 7, in operation 710, the 3D face reconstruction apparatus 100 may acquire n images of a target by controlling a plurality of stereo cameras in response to an image acquirement request. Here, n denotes a natural number.

For example, the 3D face reconstruction apparatus 100 may detect, as a user capture signal, a hardware signal generated by wired/wireless equipment or a software signal generated in response to a user's button click on the PC screen.

The 3D face reconstruction apparatus 100 may detect an image acquirement request in response to detection of the user capture signal and in response thereto, may generate a synchronization signal for a type of each stereo camera, may control the plurality of stereo cameras to simultaneously capture images of the target, and may read and acquire each image that is stored and maintained in a memory to correspond to identification information according to the simultaneous capturing.

In operation 720, the 3D face reconstruction apparatus 100 may extract n face regions from the n images, respectively.

Each of images acquired by the plurality of stereo cameras may include a background region and a region in which a background and a foreground coexist. The 3D face reconstruction apparatus 100 may perform background modeling on each image based on a guideline, and may remove, from each image, a background region corresponding to a region outside the guideline for face capturing.

Also, the 3D face reconstruction apparatus 100 may remove a first background portion having a similar pixel to the background region, from a region acquired by removing the background region, for example, the region in which the background and the foreground coexist.

A portion excluding the face region may be classified as a foreground and thereby included in the remaining region from which the first background portion is removed. In this example, the 3D face reconstruction apparatus 100 may extract the face region by further removing the second background portion from the remaining region using face shape information on a facial size and frame of the target. Alternatively, when a portion of a face is removed from the first background portion, the 3D face reconstruction apparatus 100 may extract a face region in which the removed portion of the face is filled using the face shape information.

In operation 730, the 3D face reconstruction apparatus 100 may reconstruct a viewpoint-based face image based on the n face regions.

For example, the 3D face reconstruction apparatus 100 may generate a disparity map about a stereo camera used to acquire an image, and may generate a 3D coordinate value at which a face region is positioned on the viewpoint-based face image, using the disparity map.

In operation 740, the 3D face reconstruction apparatus 100 may remove an estimated error point from the viewpoint-based face image.

The 3D face reconstruction apparatus 100 may calculate a correspondence point of a predetermined point within a first face image and a disparity value of the correspondence point, from a second face image having a viewpoint different from a viewpoint of the first face image, and may compare the disparity value of the correspondence point with a disparity value of a neighboring correspondence point identified from the second face image. When a difference between the disparity value of the correspondence point and the disparity value of the neighboring correspondence point exceeds a predetermined error range, the 3D face reconstruction apparatus 100 may remove the correspondence point from the second face image and thereby remove the estimated error point from the viewpoint-based face image.

The 3D face reconstruction apparatus 100 may perform final reconstruction by removing an estimated error point from each viewpoint-based face image, by minimizing an error, and by performing matching processing. Accordingly, it is possible to prevent propagation of an error value and to achieve a highly precise face reconstruction with a performance similar to an active sensor, for example, the average error of about 0.5 mm.

In operation 750, the 3D face reconstruction apparatus 100 may perform matching processing on the viewpoint-based face image from which the estimated error point is removed.

The 3D face reconstruction apparatus may merge the viewpoint-based face images into a single face image, may generate a texture map about the merged face image using visual field portions and non-visual field portions of the plurality of stereo cameras, and may process the entire tone of the generated texture map to be matched.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of reconstructing a three-dimensional (3D) face from images captured by a plurality of stereo cameras, the method comprising:
   simultaneously acquiring n images of a target by controlling the plurality of stereo cameras in response to an image acquirement request, wherein n denotes a natural number equal to or greater than 4;
   extracting n face regions from the n images, respectively;
   reconstructing a viewpoint-based face image based on the n face regions;
   determining an estimated error point in the viewpoint-based face image based on a 3D coordinate value or a disparity value of a point in the viewpoint-based face image that exceed respective predetermined error ranges;
   removing the estimated error point from the viewpoint-based face image; and
   performing matching processing on the viewpoint-based face image from which the estimated error point is removed,
   wherein each stereo camera comprises a plurality of digital single-lens reflex (DSLR) cameras.

2. The method of claim 1, wherein the reconstructing comprises:
   generating a disparity map about a stereo camera used to acquire an image; and
   generating a 3D coordinate value at which a face region is positioned on the viewpoint-based face image, using the disparity map.

3. The method of claim 1, wherein the removing of the estimated error point comprises:
   calculating a correspondence point of a predetermined point within a first face image and the disparity value of the correspondence point, from a second face image having a viewpoint different from a viewpoint of the first face image;
   comparing the disparity value of the correspondence point with a disparity value of a neighboring correspondence point identified from the second face image; and
   removing the correspondence point from the second face image when a difference between the disparity value of the correspondence point and the disparity value of the neighboring correspondence point exceeds the predetermined error range.

4. The method of claim 1, wherein the removing of the estimated error point comprises:
   identifying a point having the disparity value or the 3D coordinate value exceeding the respective predetermined error ranges from the viewpoint-based face image, using face shape information of the target; and removing the identified point from the viewpoint-based face image.

5. The method of claim 1, wherein the performing of the matching processing comprises:
merging the viewpoint-based face images into a single face image;
generating a texture map about the merged face image using visual field portions and a non-visual field portions of the plurality of stereo cameras; and
processing the entire tone of the generated texture map to be matched.

6. The method of claim 5, wherein the merging comprises merging an overlapping region between the viewpoint-abased face images to be merged, using an average value.

7. The method of claim 1, wherein the acquiring comprises:
controlling the plurality of stereo cameras to simultaneously capture an image of the target by generating a synchronization signal for each of the plurality of stereo cameras; and
storing and maintaining, in a memory, each captured image in association with identification information.

8. The method of claim 1, wherein the image acquirement request is generated through a hardware method using wired/wireless equipment or a software method using a button click on a personal computer (PC) screen.

9. The method of claim 1, wherein the extracting comprises:
modeling a background region included in an image, based on a guideline for each stereo camera; and
extracting a face region by removing a first background portion from a region acquired through modeling.

10. The method of claim 9, wherein the extracting of the face region further comprises:
further removing a second background portion included in a remaining region from which the first background portion is removed, using face shape information of the target; or
extracting the face region by adding, to the remaining region, a face portion included in the removed first background portion.

11. The method of claim 1, further comprising:
generating a mask image of the extracted face region.

12. An apparatus for reconstructing a three-dimensional (3D) face from images captured by a plurality of stereo cameras, the apparatus comprising a non-transitory computer-readable medium which, when executed by the computer, performs the following method:
simultaneously acquiring n images of a target by controlling the plurality of stereo cameras in response to an image acquirement request, wherein n denotes a natural number equal to or greater than 4;
extracting n face regions from the n images, respectively;
reconstructing a viewpoint-based face image based on the n face regions;
determining an estimated error point in the viewpoint-based face image based on a 3D coordinate value or a disparity value of a point in the viewpoint-based face image that exceed respective predetermined error ranges;
removing the estimated error point from the viewpoint-based face image; and
performing matching processing on the viewpoint-based face image from which the estimated error point is removed,
wherein each stereo camera comprises a plurality of digital single-lens reflex (DSLR) cameras.

* * * * *